United States Patent
Hayakawa et al.

(10) Patent No.: US 6,418,520 B1
(45) Date of Patent: Jul. 9, 2002

(54) ADDRESS CONVERTING CIRCUIT UTILIZING STRING COMPARISON AND CARRY INFORMATION CALCULATION

(75) Inventors: Shigeyuki Hayakawa, Kawasaki; Tsuyoshi Midorikawa, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 112 days.

(21) Appl. No.: 09/624,244

(22) Filed: Jul. 24, 2000

(30) Foreign Application Priority Data

Jul. 23, 1999 (JP) .................................. 11-209775

(51) Int. Cl.[7] .......................... G06F 12/00; G06F 12/10
(52) U.S. Cl. ....................................... 711/203; 711/200
(58) Field of Search ................................ 711/200, 202, 711/203, 118, 154

(56) References Cited

U.S. PATENT DOCUMENTS

| | | | | |
|---|---|---|---|---|
| 4,910,668 A | * | 3/1990 | Okamoto et al. | 711/207 |
| 5,047,958 A | * | 9/1991 | Comins et al. | 395/516 |
| 5,095,446 A | * | 3/1992 | Jingu | 395/516 |
| 5,148,538 A | | 9/1992 | Celtruda et al. | |
| 5,278,962 A | * | 1/1994 | Masuda et al. | 711/207 |
| 5,404,477 A | * | 4/1995 | Jippo | 711/203 |
| 5,584,003 A | * | 12/1996 | Yamaguchi et al. | 711/3 |
| 5,890,220 A | * | 3/1999 | Mochida et al. | 711/206 |
| 5,931,895 A | * | 8/1999 | Yamada et al. | 708/500 |
| 6,289,429 B2 | * | 9/2001 | Okamoto | 711/202 |

FOREIGN PATENT DOCUMENTS

JP    7-191911    7/1995

* cited by examiner

*Primary Examiner*—Tuan V. Thai
(74) *Attorney, Agent, or Firm*—Finnegan, Henderson, Farabow, Garrett & Dunner, L.L.P.

(57) ABSTRACT

Object of the present invention is to provide an address converting circuit capable of converting a virtual address that access is required into a physical address.

The address converting circuit of the present invention has a CLA circuit, an adder, a CAM, a carryout selector, a physical address storing section, and a physical address selector. When adding both of the upper bit strings of the base address and the offset address that access is required, before the carryout signal from the lower bit string is calculated, addition of both of the upper bit strings in case of presuming the carryout signal as "0" and addition of both of the upper bit strings in case of presuming the carryout signal as "1" are performed. Either of the added results is selected by the carryout signal in order to perform the comparing process. Because of this, it is possible to convert into the physical address at high speed.

20 Claims, 12 Drawing Sheets

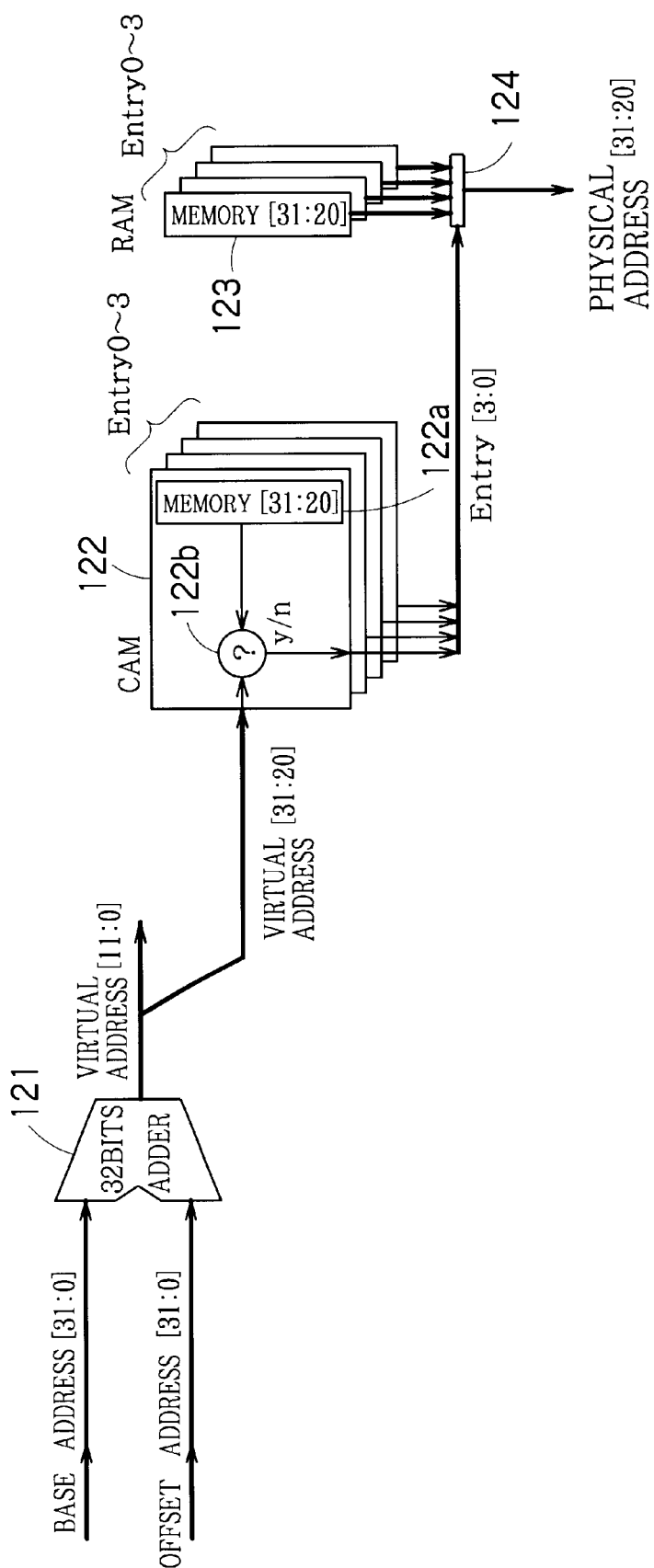
F I G. 1

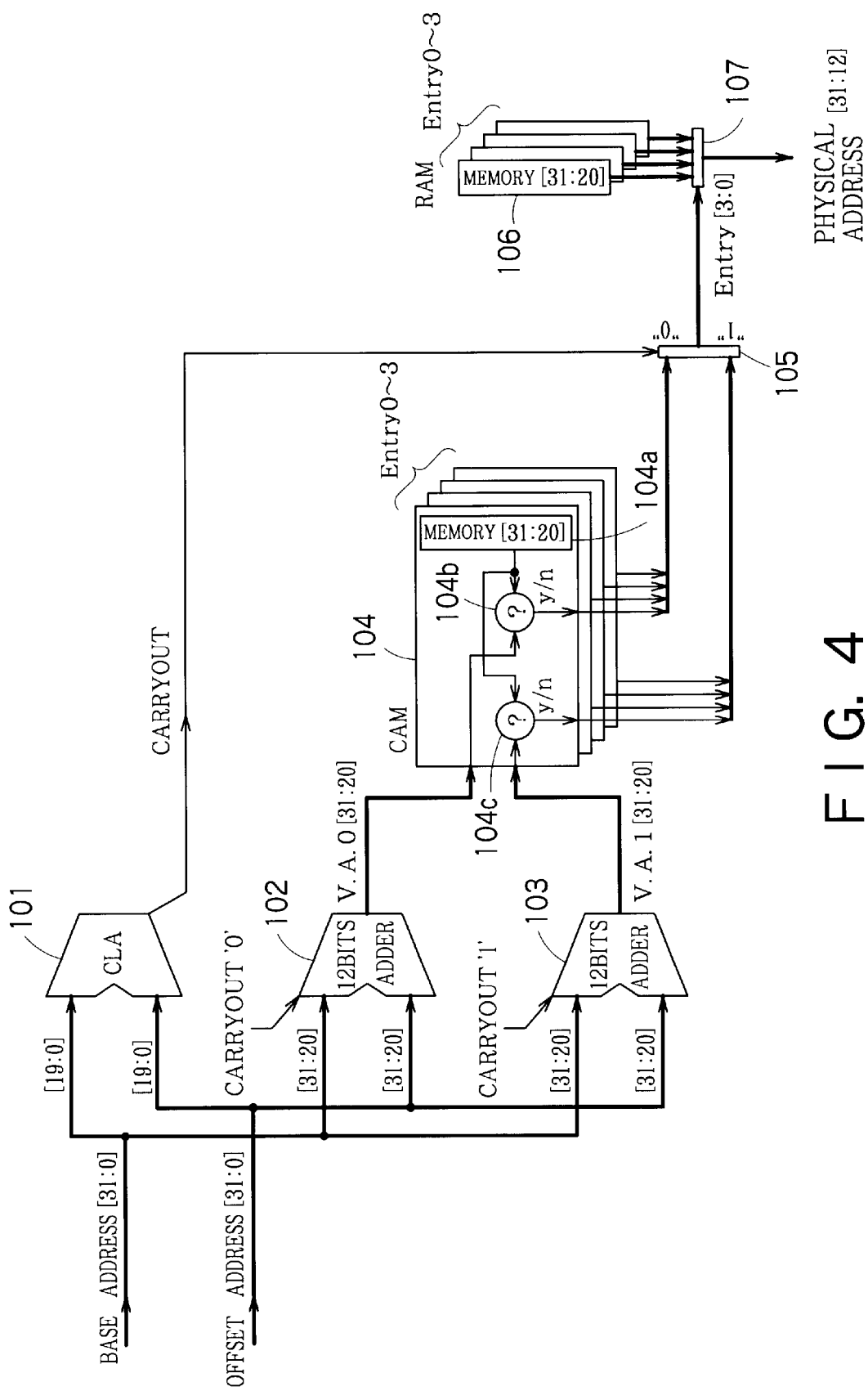
F I G. 4

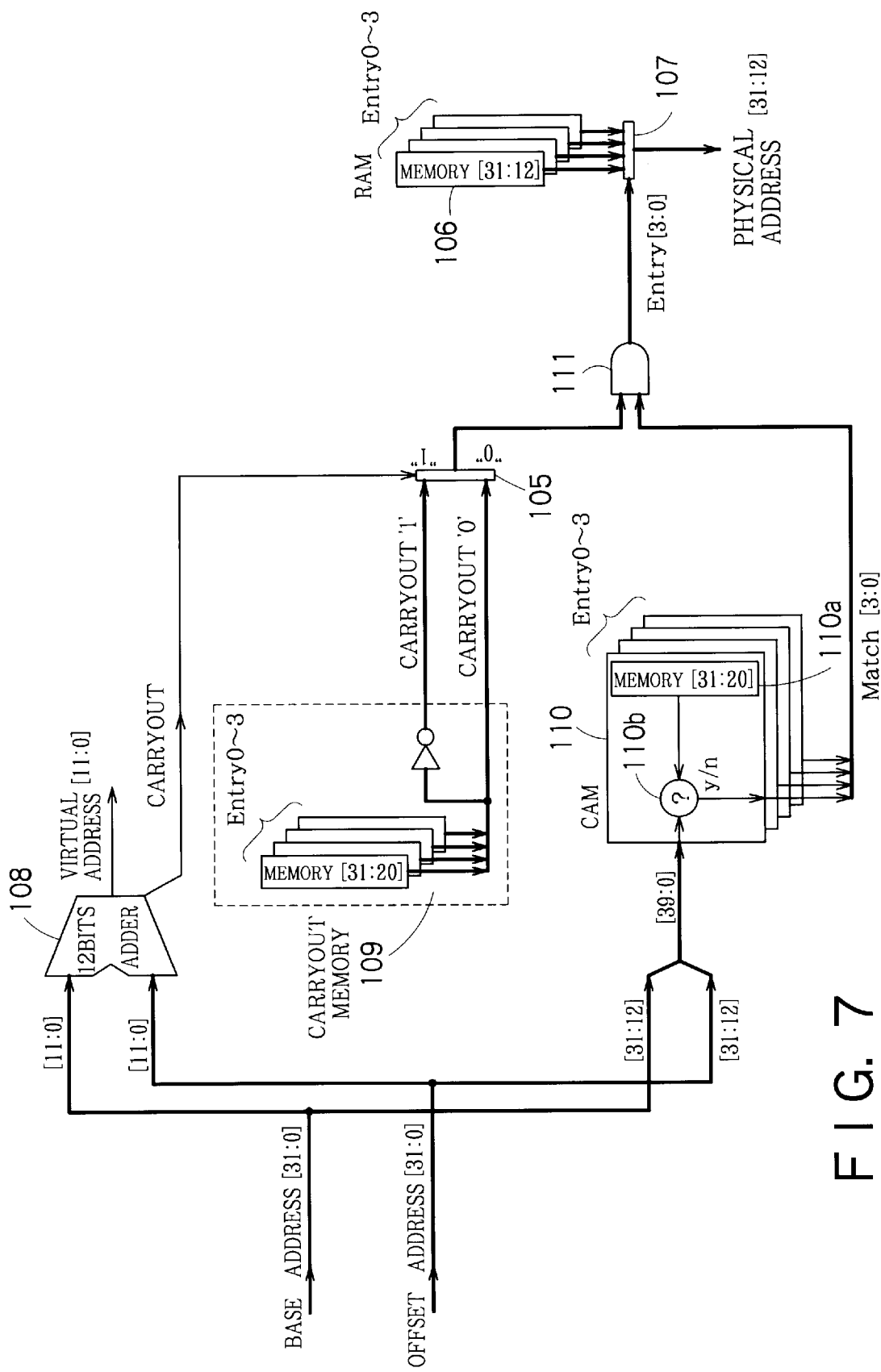
F I G. 7

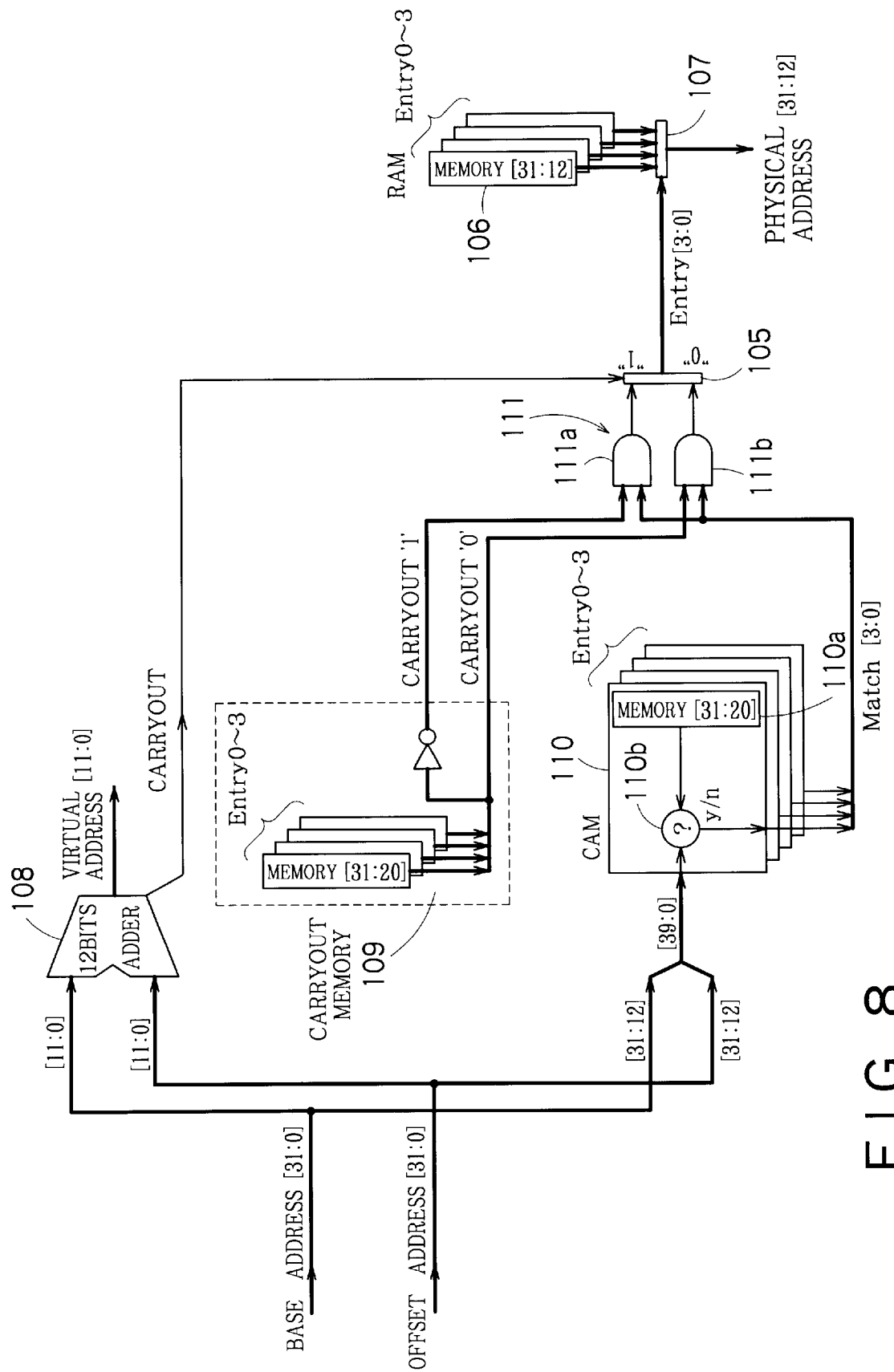
F I G. 8

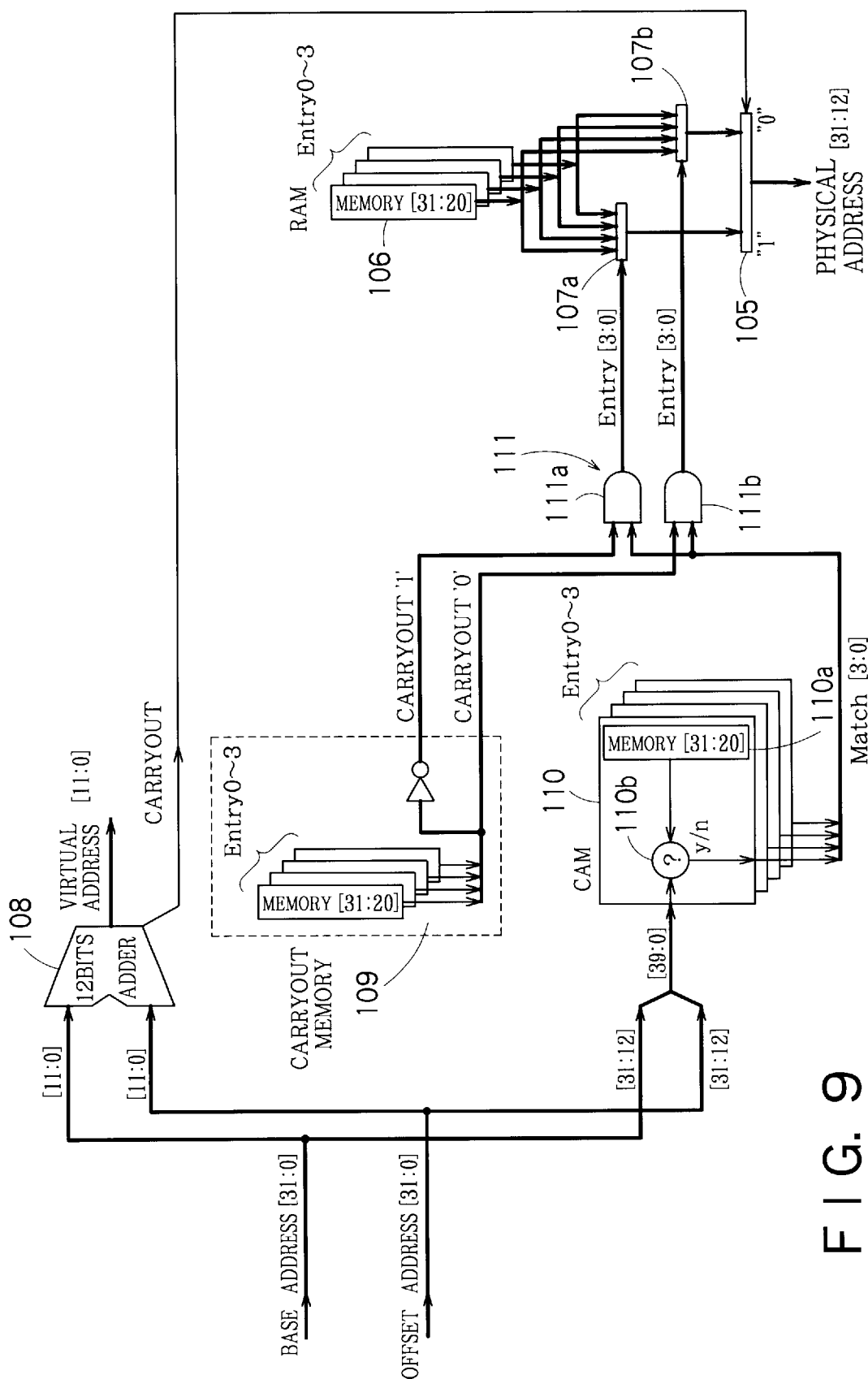
F I G. 9

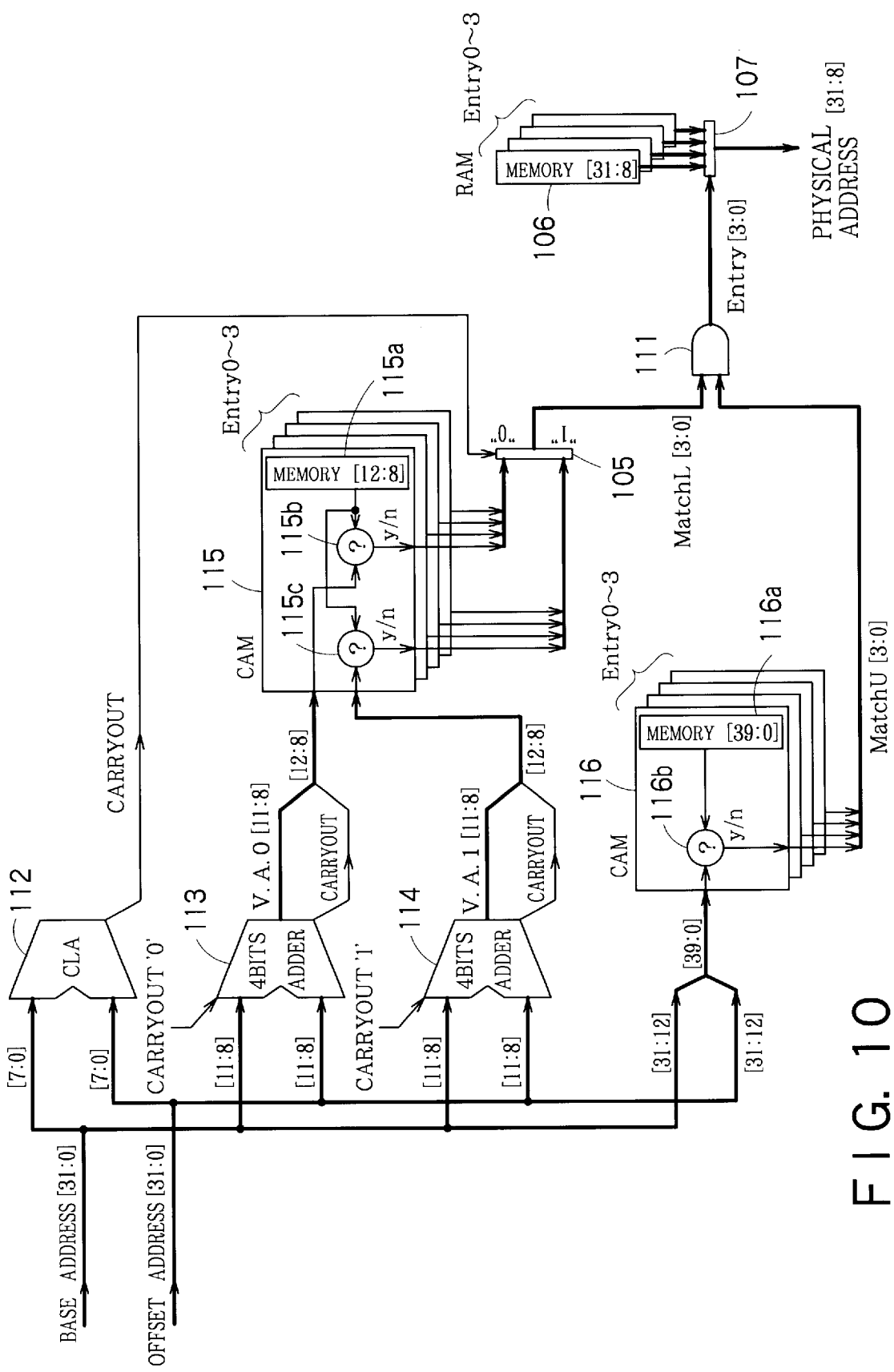
F I G. 10

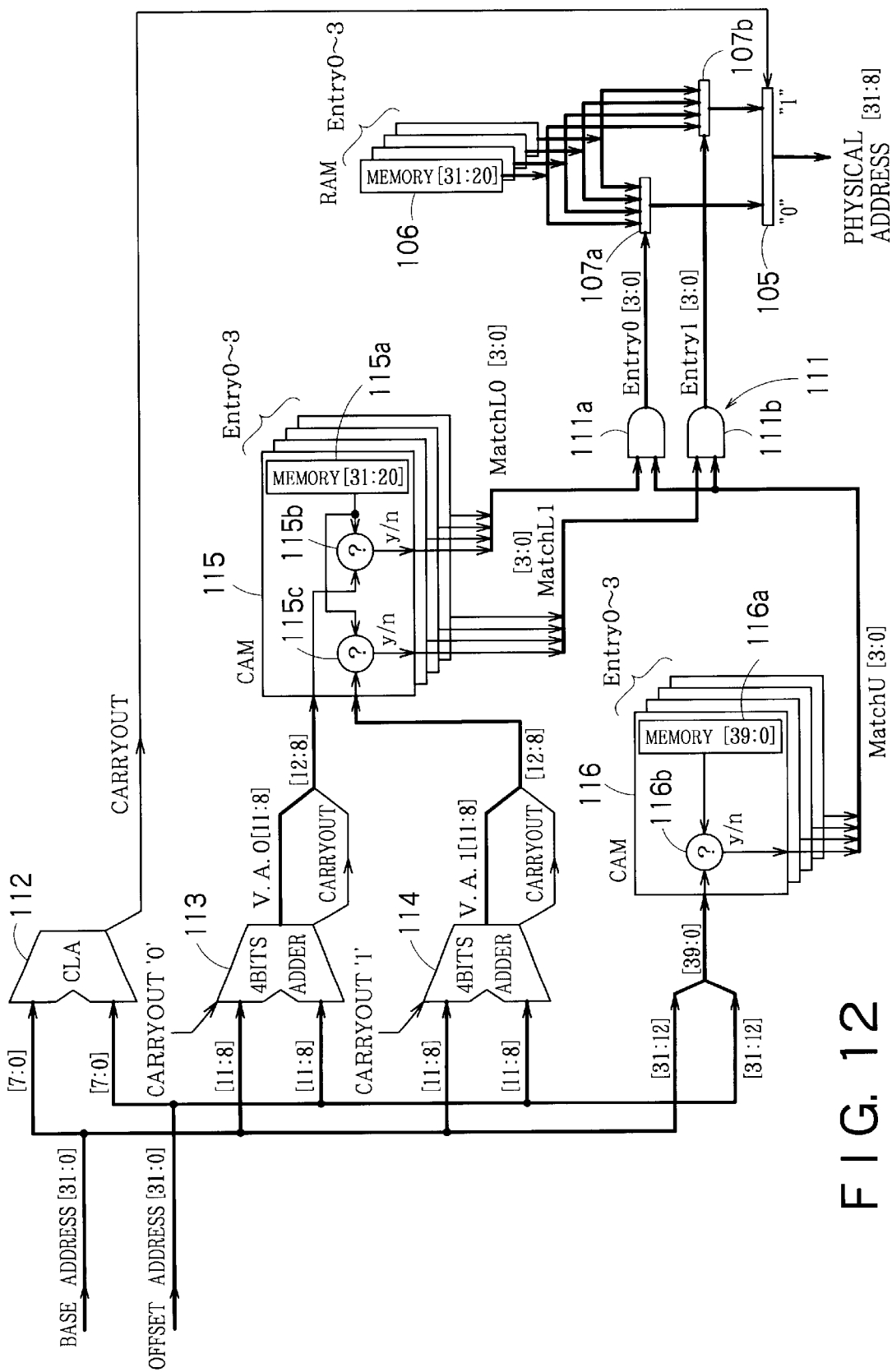
F I G. 12

ADDRESS CONVERTING CIRCUIT UTILIZING STRING COMPARISON AND CARRY INFORMATION CALCULATION

CROSS REFERENCE TO RELATED APPLICATIONS

The subject application is related to subject matter disclosed in Japanese Patent Application No. H11-209775 filed on Jul. 23, 1999 in Japan to which the subject application claims priority under Paris Convention and which is incorporated herein by reference.

BACKGROUND OF THE INVENTION

1. Field of the Invention

The present invention relates to an address converting circuit configured to convert a virtual address inputted from outside into a physical address. Especially, the present invention is intended for a circuit included in a microprocessor.

2. Related Background Art

Recently, processors generally employ a virtual addressing method which allocates a part of a virtual address space to a main memory. By employing the virtual addressing method, application program can perform memory-access with disregard to the main memory, thereby simplifying programming.

The virtual address is obtained by adding a base address and an offset address. Inside of the processor is provided with an address converting circuit, i.e. TLB:Translation Lookaside Buffer for converting the virtual address into the physical address.

FIG. 1 is a block diagram showing schematic configuration of a conventional address converting circuit. The address converting circuit of FIG. 1 has an adder 121 for adding the base address [31:0] and the offset address [31:0], a CAM (Contents Addressable Memory) for comparing the virtual address outputted from the adder 121 with the virtual address corresponding to data stored to the cache memory, a physical address storing section 123 for storing the physical address corresponding to data stored to the cache memory, and a selector 124 for reading out the physical address [31:20] corresponding to the virtual address that access is required from the physical address storing section 123.

Because the circuit of FIG. 1 performs a comparison by the CAM 122 after the virtual address expressing an added result is outputted from the adder 121, a processing time of all the TLBs is decided by the calculating time of the adder 121. Because of this, it is impossible to process at high speed.

SUMMARY OF THE INVENTION

An object of the present invention is to provide an address converting circuit that it is possible to convert a virtual address that access is required into a physical address at high speed.

In order to achieve the foregoing object, an address conversion circuit for converting a virtual address that access is required into a physical address, comprising:
  upper bit string storing means configured to store an upper bit string of the virtual address corresponding to data stored to a cache memory;
  an upper bit string adder configured to add both of the upper bit strings of a base address and an offset address of the virtual address, by predicting in advance with or without carry when both of a lower bit strings of the base address and the offset address of the virtual address that access is required are added;
  a carry calculator configured to calculate carry information when both of the lower bit strings of the base address and the offset address of the virtual address that access is required are added;
  an upper bit string comparator configured to compare a result added by the upper bit string adder with the upper bit string of the virtual address stored to the upper bit string storing means, and
  an address converter configured to convert the virtual address that access is required into the physical address, based on a result calculated by the carry calculator and a result compared by the upper bit stream comparator.

Furthermore, an address converter configured to convert a virtual address that access is required into a physical address, comprising:
  upper bit string storing means configured to store an upper bit string of the virtual address corresponding to data stored to a cache memory;
  carry information storing means configured to calculate carry information in case of adding both of a lower bit strings of a base address and an offset address of the virtual address corresponding to data stored to the cache memory;
  a carry information calculator configured to calculate the carry information in case of adding both of the lower bit strings of the base address and the offset address of the virtual address that access is required;
  an upper bit string comparator configured to compare the upper bit strings of the base address and the offset address of the virtual address that access is required with the upper bit strings of the base address and the offset address of the virtual address stored to the upper bit string storing means, and
  address converter for converting the virtual address that access is required into the physical address based on information stored to the carry information storing means, carry information calculated by the carry information, and the result compared by the upper bit string comparator.

Furthermore, an address converting circuit configured to convert a virtual address that access is required into a physical address, comprising:
  upper bit string storing means configured to store an upper bit string of the virtual address corresponding to data stored to a cache memory;
  an intermediate bit string storing means configured to store intermediate bit strings of the virtual address corresponding to data stored to the cache memory;
  an intermediate bit string adder configured to add both of intermediate bit strings of a base address and an offset address of the virtual address, by predicting in advance with or without a carry in case of adding both lower bit strings of the base address and the offset address of the virtual address that access is required;
  an intermediate bit string comparator configured to compare the result added by the intermediate bit string adder with the intermediate bit string of the virtual address stored to the intermediate bit string storing means;
  an upper bit string comparator configured to compare the upper bit string of the base address and the offset address of the virtual address that access is required with the upper bit strings of the base address and the offset address of the virtual address stored to the upper bit stream storing means;

carry information calculator configured to calculate the carry information in case of adding both of the lower bit strings of the base address and the offset address of the virtual address that access is required, and an address converter configured to convert the virtual address that access is required into the physical address based on the result compared by the upper bit stream comparator, the result compared by the intermediate bit stream comparator, and the result calculated by the carry information calculator.

According to the present invention, it is possible to perform comparing process of a virtual address and to convert the virtual address into the physical address before the carry information is calculated, because the comparing process of the upper bit string and the intermediate bit string are performed in parallel with calculation of the carry information from the lower bit string of the virtual address.

BRIEF DESCRIPTION OF THE DRAWINGS

FIG. 1 is a block diagram showing schematic configuration of a conventional address converting circuit.

FIG. 4 is a block diagram showing schematic configuration of the first embodiment of the address converting circuit according to the present invention.

FIG. 7 is a block diagram showing schematic configuration of a third embodiment of an address converting circuit.

FIG. 8 is a block diagram showing schematic configuration of a fourth embodiment of an address converting circuit.

FIG. 9 is a block diagram showing schematic configuration of a fifth embodiment of an address converting circuit.

FIG. 10 is a block diagram showing schematic configuration of a sixth embodiment of an address converting circuit.

FIG. 12 is a block diagram showing schematic configuration of an eight embodiment of an address converting circuit.

DESCRIPTION OF THE PREFERRED EMBODIMENTS

Hereinafter, an address converting circuit according to the present invention will be specifically described with reference to drawings. Hereinafter, an example that the address converting circuit according to the present invention is provided in a processor will be described.

(First Embodiment)

Figure 2:
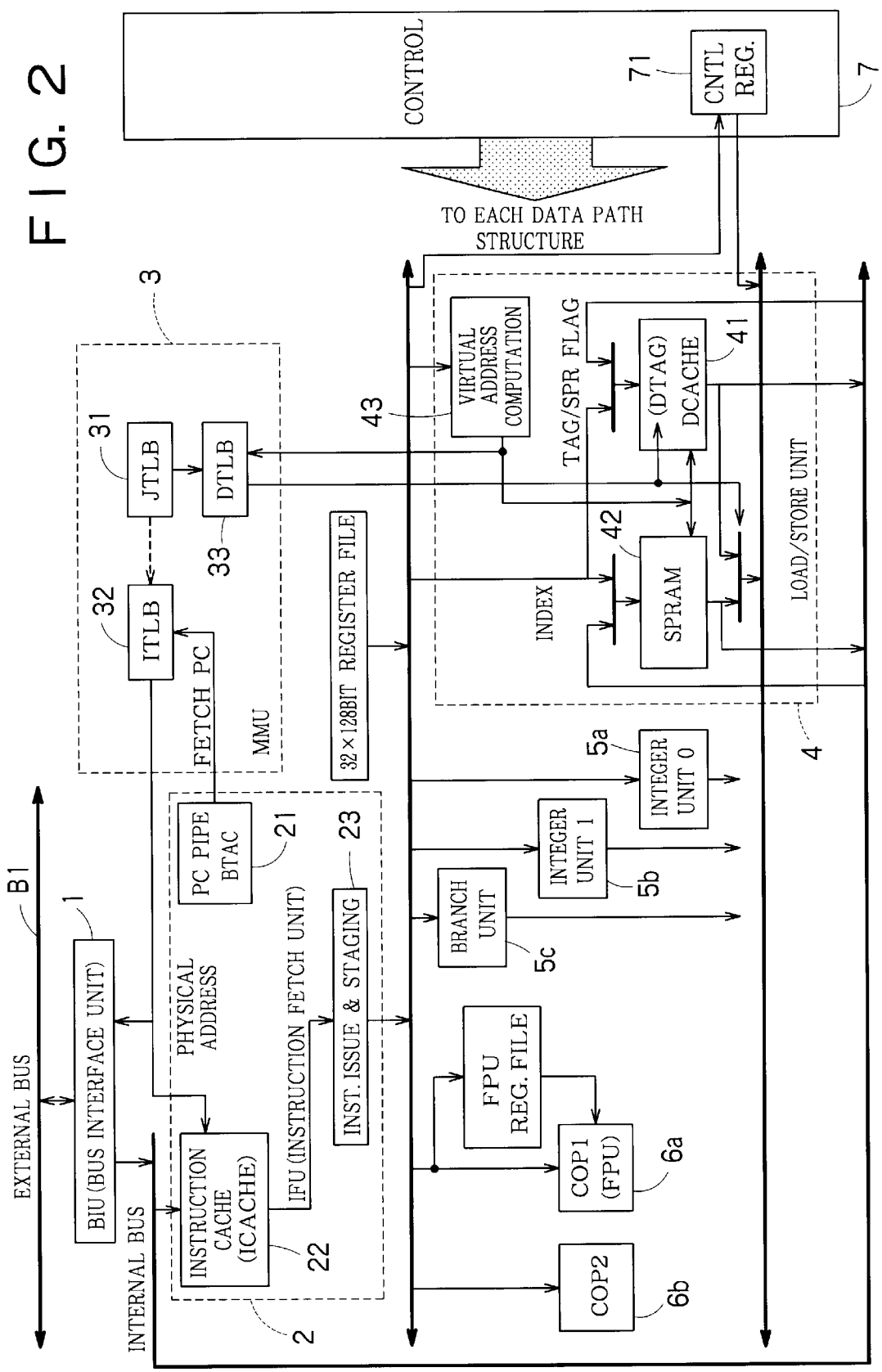
FIG. 2 is a block diagram showing inside configuration of the microprocessor.

First of all, inside configuration of the microprocessor will be explained. FIG. 2 is a block diagram showing inside configuration of the microprocessor. The microprocessor of FIG. 2 has a bus interface unit 1 connected to outside bus B1, an IFU (Instruction Fetch Unit) 2 for fetching instructions executed by the processor, an MMU (Memory Management Unit) 3 for converting the virtual address into the physical address, and LSU (Load Store Unit) 4 for executing the instructions relating to load/store, a plurality of execution units 5a, 5b and 5c for executing the instructions besides load/store, FPUs (Floating Point Units) 6a, 6b and 6c for performing floating point calculation, and a control logic section 7 for controlling each block in the processor.

The IFR 2 has a PC pipe (PC-pipe) 21 for generating PC (Program Counter) with reference to BTAC for storing a branch destination such as a branch instruction, ICACHE (Instruction Cache memory) 22 for temporarily storing the instructions, an Instruction issue & Staging block 23 for discriminating types of the instructions and selecting execution units to execute the discriminated instructions.

The MMU 3 has three TLBs (Translation Lookaside Buffers) for converting the virtual address into the physical address. The address converting information necessary for the processor, for example, a physical page number and memory protection information, are written into the TLBs. The MMU 3 performs the conversion for the physical address.

Three types of the TLBs in the MMU 3 are a JTLB (Joint Translation Lookaside Buffer) 31, an ITLB (Instruction Translation Lookaside Buffer) 32, and a DTLB (Data Translation Lookaside Buffer) 33.

The ITLB 32 and the DTLB 33 are collectively called as a micro TLB. The ITLB 32 is a special TLB directly connected to a datapath of the virtual address of the instructions. The DTLB 33 is a special TLB directly connected to the datapath of the virtual address of data. Although these TLBs have a few numbers of the entries, they perform address conversion at high speed. A part of a conversion table generated by the JTLB 31 is copied to the ITLB 32 and the DTLB 33, if necessary.

The JTLB 31 is controlled by software. On the other hand, coherency of the micro TLBs and the JTLB is maintained by hardware. The microprocessor issues exception when no conversion table exists in the JTLB 31. An exception handler searches the corresponding page from a page table of OS and writes information of the conversion table into the JTLB 31.

The LSU 4 has a DCACHE (Data Cache Memory) 41 for temporarily storing read/write data for the external memory and an address generator (Virtual Address Computation) 43 for generating the virtual address necessary for access to the DCACHE 41.

The control logic 7 controls each block in the processor. The control logic 7 is provided with a control register 71.

Next, operation of the microprocessor shown in FIG. 2 will be explained. First of all, the IFU 2 fetches the instruction based on the PC generated by the PC pipe 21. The PC is the virtual address.

The ITLB 32 converts the PC from the virtual address into the physical address. The converted physical address is used to search the ITAG in the ICACHE 22. That is, the physical address is used to detect whether or not the instruction indicated by the PC exists in the ICACHE 22. When the instruction indicated by the PC does not exist in the ICACHE 22, that is, when cache miss occurs, access to the external memory unshown is carried out by using the physical address.

When the cache miss occurs, the information showing the occurrence of the cache miss and physical address information are delivered to the control logic in the BIU 1. The BIU 1 accesses the external memory based on these information. When the access to the external memory is finished, the signal to inform of acquisition of cache line is applied to the IFU 2. The IFU 2 writes into the ICACHE 22 data obtained by access to the memory. At the same time, among the instructions included in the refilled cache line, the instructions indicated by the PC, or in a specific case, several instructions following to the instruction indicated by the PC is supplied to the instruction issue & staging block 23.

On the other hand, when the instruction indicated by the PC exists in the ICACHE 22, the corresponding instruction in the ICACHE 22 and several instructions subsequent to the instruction indicated by the PC are supplied to the instruction issue & staging block 23. In this case, the instruction issue & staging block 23 decides dynamically the execution unit in accordance with spare condition of each execution unit.

For example, when the discriminated instruction is load/store instruction, because only the LSU 4 can execute the instructions, the instruction issue & staging block 23 sends the instruction to the LSU 4 when the LSU 4 is ready to execute the instruction.

Figure 3:
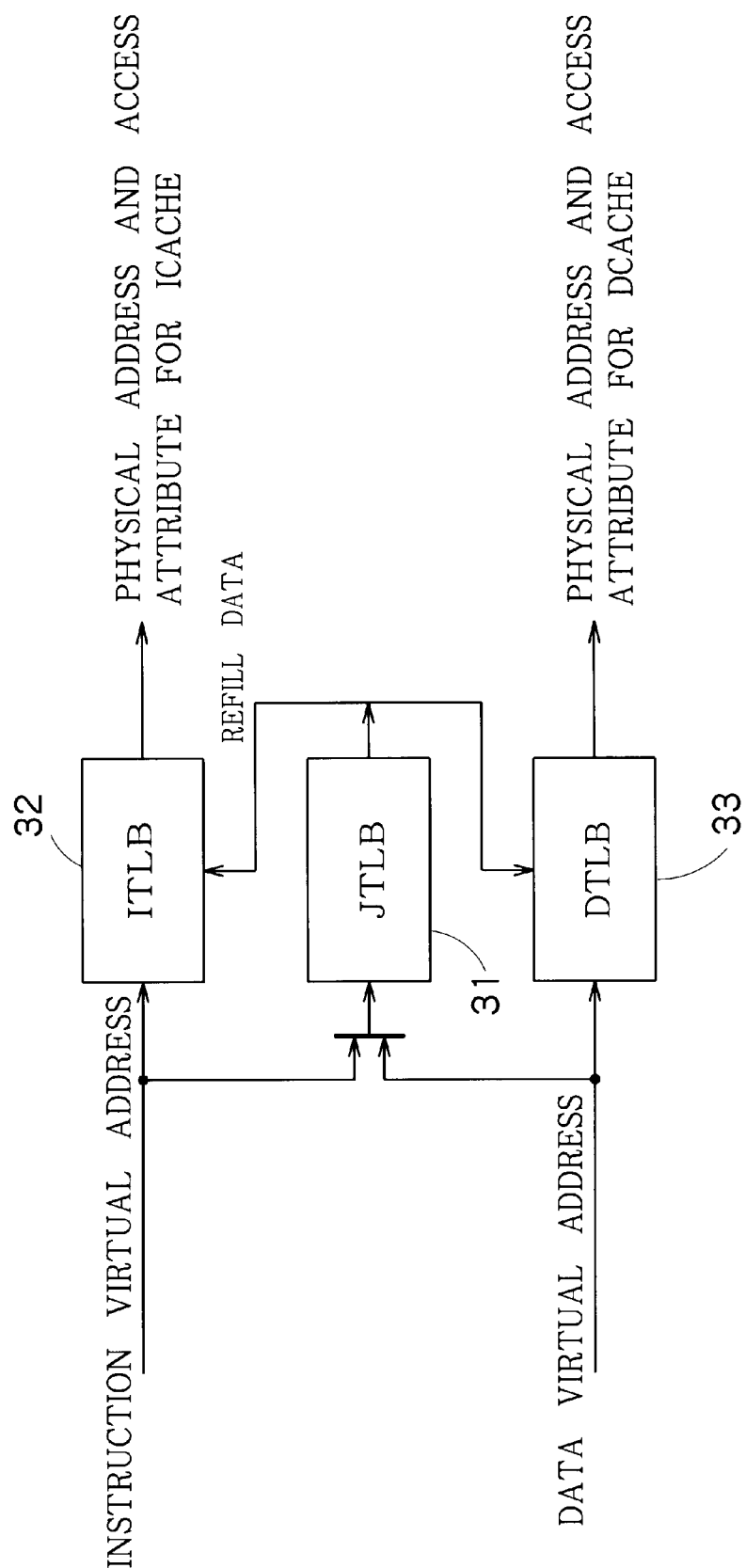
FIG. 3 is a diagram showing an inside configuration of the MMU.

FIG. 3 is a diagram showing an inside configuration of the MMU 3. As described above, inside of the MMU 3 is provided with three TLBs. Among three TLBs, the JTLB is a primary TLB. The JTLB has, for example, 48 entries. It generates a conversion table for conversion to the physical address by mapping the virtual address by each page.

The conversion table generated by the JTLB 31 is copied to the ITLB 32 and the DTLB 33, if necessary. The reason why three TLBs are provided is because it takes much time for the JTLB 31 to perform address converting process, since the JTLB 31 has many entries. Accordingly, only a part necessary for address conversion from the conversion table is copied to the ITLB 32 and the DTLB 33 in order to perform address conversion at high speed.

Next, inside configuration of the TLBs will be described in detail. Hereinafter, the TLBs will be collectively called as an address converting circuit.

FIG. 4 is a block diagram showing schematic configuration of the first embodiment of the address converting circuit according to the present invention. FIG. 4 shows an example of improving the address converting circuit of FIG. 1. The address converting circuit of FIG. 4 has a CLA (Carry Lockaside) circuit 101, an adder (upper bit string adder and first adder) 102, an adder (upper bit string adder and second adder) 103, a CAM (Contents Addressable Memory) 104, a carryout selector 105, a physical address storing section 106, and a physical address selector 107. The physical address storing section 106 and the physical address selector 107 corresponds to an address converter.

Figure 5:
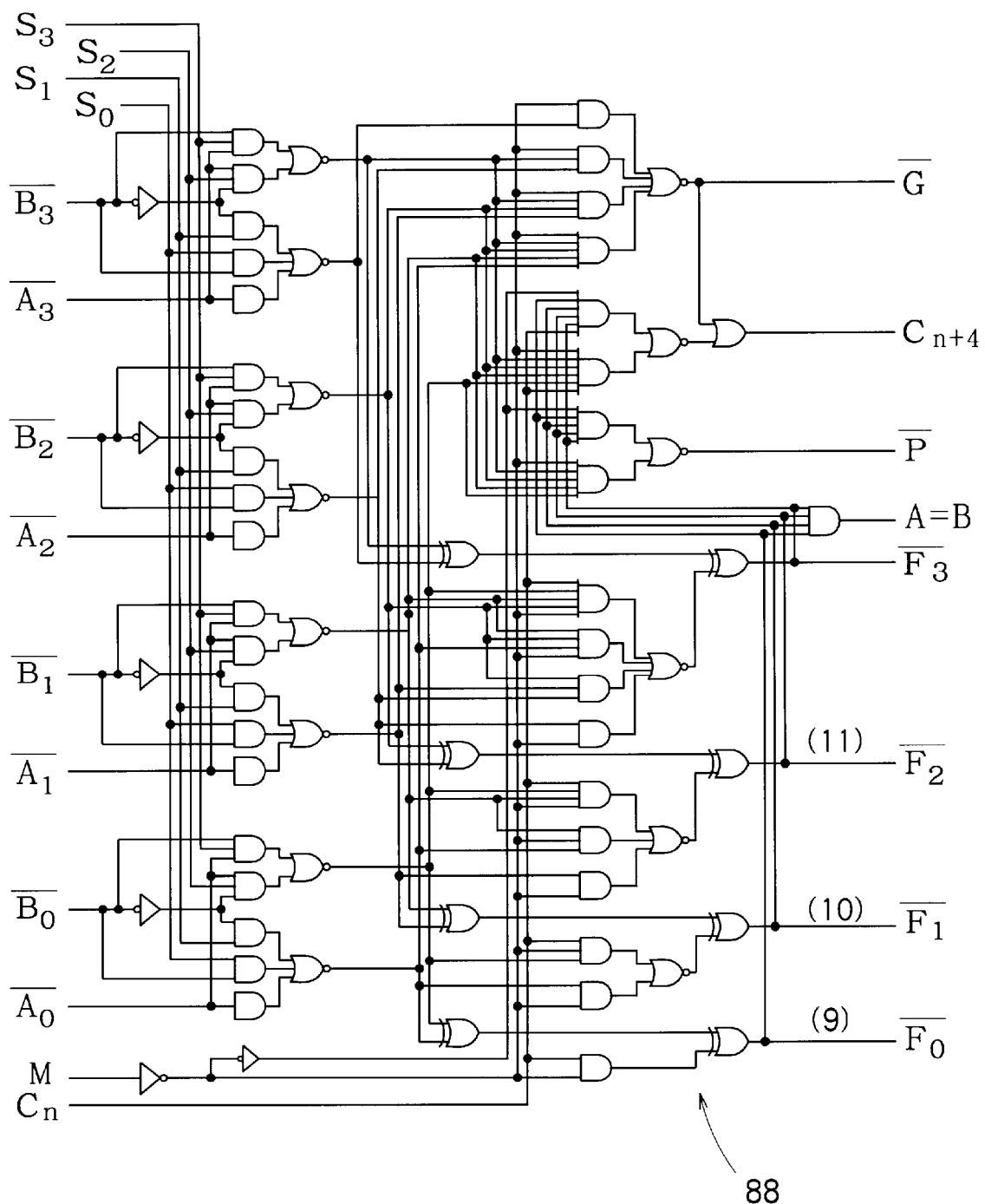
FIG. 5 is a circuit diagram showing schematic configuration of a CLA circuit.

The CLA circuit (carry calculator) 101 outputs the carry information (carryout signal) in case of adding both of the lower bit strings [19:0] of the base address and the offset address of the virtual address that access is required. It is desirable to output the carry information before the add operation of the adders 102 and 103 finishes. The CLA circuit 101 is, for example, configured by a circuit showing in FIG. 5. The circuit of FIG. 5 shows an example of outputting the carry signal by adding four bits A0–A3 and B0–B3.

The adder 102 outputs the result of adding both of the upper bit strings of the base address and the offset address of the virtual address that access is required, by presuming that there is no carry from the lower bit string [19:0].

The adder 103 outputs the result of adding both of the upper bit strings [31:20] of the base address and the offset address of the virtual address that access is required. That is, the adder 103 outputs a value of adding "1" to the output of the adder 102.

The CAM 104 has an upper bit string storing section (upper bit string storing means) 104a for storing the upper bit string [31:20] of the virtual address corresponding to data stored to the DCACHE (hereinafter, it may be called as cache memory) 41, a first address comparator (upper bit string comparator, first comparator) 104b for outputting the result of comparing the output of the adder 102 with the virtual address stored to the upper bit string storing section 104a in order to output the compared output, and a second address comparator (upper bit string comparator and second comparator) 104c for comparing the output of the adder 103 with the virtual address stored to the upper bit string storing section 104a in order to output the compared result.

The upper bit string storing section 104a is divided into, for example, four entries 0–3. Each entry stores the virtual address different from each other, respectively. The first and second address comparators 104b and 104c compare address by each entry, and output 4 bits signals Entry0 [3:0] and Entry1[3:0] showing the result of comparing all entries, respectively.

The carryout selector 105 selects the compared result [3:0] of either of the first or second address comparator 104b or 104c, in accordance with the carryout signal from the CLA circuit 101.

The physical address storing section 106 stores the physical address corresponding to data stored to the cache memory by each of a plurality of entries, for example, Entry0–3.

The physical address selector 107 selects the entry of the physical address storing section 106 based on the signal [3:0] that the carryout selector 105 selects, and reads out the physical address [31:12] stored to the selected entry. By the above-mentioned procedure, the process for converting the virtual address that access is required into the physical address is finished.

When the physical address corresponding to the virtual address that access is required is not stored to the physical address storing section 106, a refill process to the cache memory is performed. The process will be omitted.

The lower bit string [11:0] of the physical address expresses a page offset, and is the same as the lower bit string [11:0] of the virtual address that access is required.

Thus, the first embodiment carries out add operation of both of the upper bit strings in case of presuming the carryout signal as "0" and add operation of both of the upper bit strings in case of presuming the carryout signal as "1", when adding both of the upper bit strings of the base address and the offset address that access is required, before the carryout signal from the lower bit string is calculated. Because of this, it is possible to begin the comparing process before the carryout signal is outputted from the CLA circuit 101. Accordingly, it is possible to perform conversion to the physical address at high speed.

(Second Embodiment)

A second embodiment is a modified example of the first embodiment.

Figure 6:
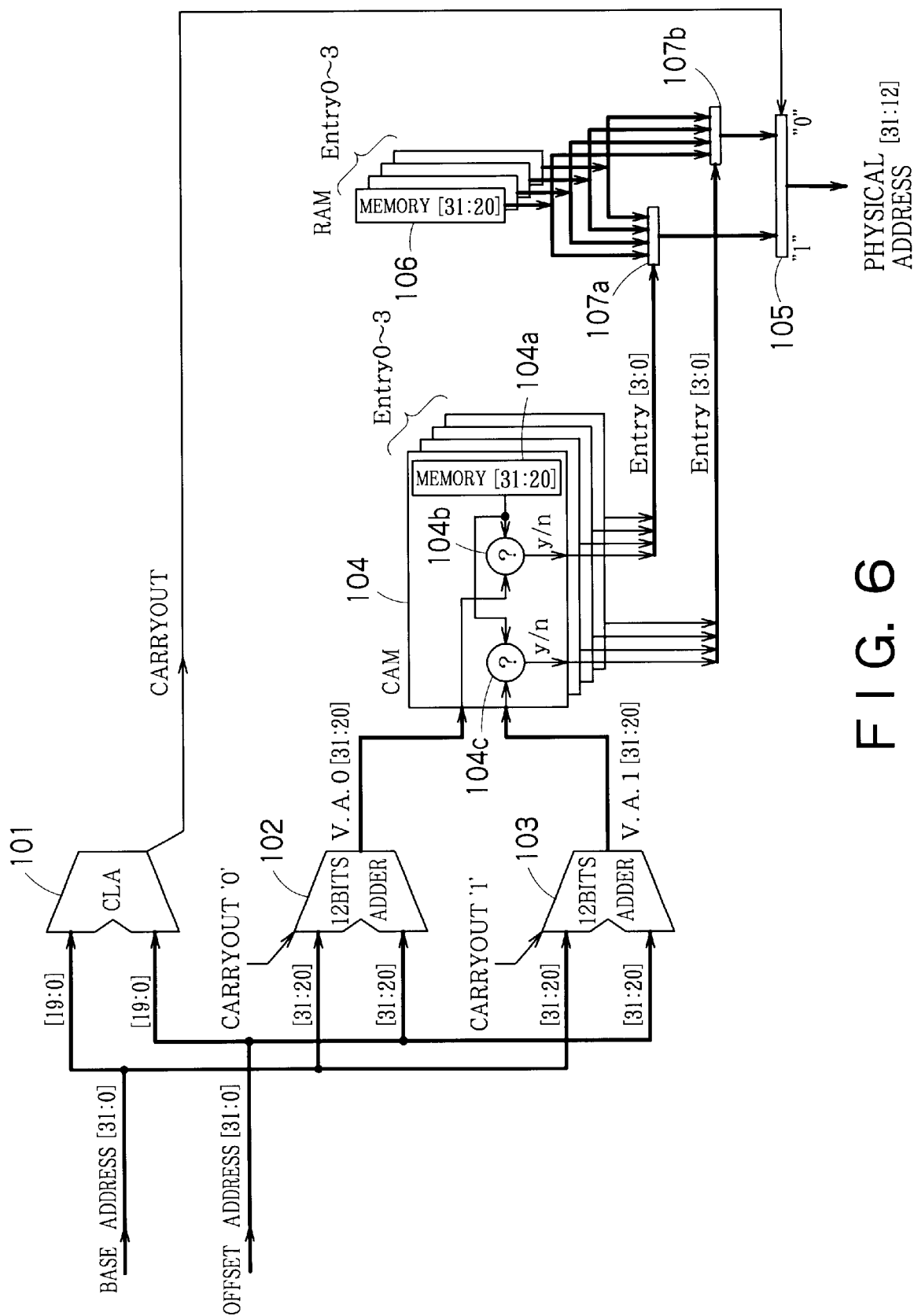
FIG. 6 is a block diagram showing schematic configuration of a second embodiment of an address converting circuit.

FIG. 6 is a block diagram showing schematic configuration of the second embodiment according to the present invention. In FIG. 6, the same figure numbers are attached to the same constituents as FIG. 4. Hereinafter, portions different from the first embodiment will be mainly explained.

The address converting circuit of FIG. 6 has a CLA circuit 101, adders 102 and 103, a CAM 104, a carryout selector (physical address selector) 105, a physical address storing section 106, and first and second physical address selectors 107a and 107b.

The first physical address selector 107a selects entry of the physical address storing section 106 based on a compared result signal [3:0] outputted from the first address comparator 104b in the CAM 104, and reads out the physical address stored to the selected entry. The second physical address selector 107b selects entry of the physical storing section 106 based on the compared result signal [3:0] outputted from the second address comparator 104c in the CAM 104, and reads out the physical address stored to the selected entry.

The carryout selector 105 selects the physical address outputted from either of the first or second physical address selector 107a or 107b based on the carryout signal outputted from the CLA circuit 101.

Thus, the second embodiment reads out from the physical address storing section the physical address in case of presuming the carryout signal as "0" and the physical address in case of presuming the carryout signal as "1", before the carryout signal is outputted from the CLA circuit 101, and when the carryout signal is outputted, the second embodiment selects either of the physical addresses. Because of this, it is possible to perform conversion to the physical address at high speed even if it takes much time to operation of the CLA circuit 101.

(Third Embodiment)

FIG. 7 is a block diagram showing schematic configuration of the third embodiment according to the present invention. In FIG. 7, the same figure numbers are attached to the same constituents as FIG. 4. Hereinafter, portions different from the first embodiment will be mainly explained.

The address converting circuit of FIG. 7 has an adder 108, a carryout memory 109, a CAM 110, a carryout selector 105, a conformity circuit 111, a physical address storing section 106, and a physical address selector 107.

The adder 108 adds both of the lower bit strings [11:0] of the base address and the offset address of the virtual address that access is required and outputs the virtual address [11:0] and the carryout signal showing the added result.

The carryout memory 109 stores the carry information (carryout signal) from 12 bits of lower side corresponding to date stored to the cache memory. When there are four entries of the carry memory, the corresponding carryout signal is stored by each entry.

The carryout selector 105 outputs a signal showing whether or not the carryout signal stored to the carryout memory 109 coincides with the carryout signal outputted from the adder 108.

The CAM 110 has a upper bit string storing section 110a and the upper bit string comparing section 110b by each entry of the cache memory.

The upper bit string storing section 110a stores the upper bit strings [31:12] of the base address and the offset address corresponding to data stored to the cache memory.

The upper bit string comparator 110b compares the upper bit string [31:12] of the base address of the virtual address that access is required with the upper bit string [31:12] of the base address stored to the upper bit string storing section 104a, and compares the upper bit string [31:12] of the offset address of the virtual address that access is required with the upper bit string [31:12] of the offset address stored to the upper bit string storing section 104a. The CAM 110 outputs a signal Match[3:0] showing the compared result.

The conformity circuit 111 has a AND gate by each entry. The AND gate outputs a signal showing whether or not the upper bit string agrees with each other and the carryout signal also agrees with each other.

The physical address selector 107 selects the entry of the physical address storing section 106 based on the output from the conformity circuit 111, and reads out the physical address corresponding to the selected entry from the physical address storing section 106.

Thus, the third embodiment detects whether or not the upper bit string agrees with each other before the carryout signal is outputted from the adder 108. Because of this, it is possible to obtain the conformity detecting result of the upper bit stream in the vicinity of time when the carryout signal is outputted from the adder 108. Accordingly, it is possible to determine whether or not the virtual address that access is required is stored to the CAM 110 at high speed, and to convert into the physical address at high speed.

The second embodiment compares the virtual address that access is required with the virtual address stored to the CAM 110, based on the conformity detecting result of the upper bit string and the conformity detecting result of the carryout signal. Because of this, it is possible to perform the comparing process more quickly than the case of comparing all the address bits.

(Fourth Embodiment)

A fourth embodiment is a modified example of the third embodiment.

FIG. 8 is a block diagram showing schematic configuration of the fourth embodiment according to the present invention. In FIG. 8, the same figure numbers are attached to the same constituents as FIG. 7. Hereinafter, portions different from the first embodiment will be mainly explained.

The address converting circuit of FIG. 8 has a feature in which the conformity circuit 111 and the carryout selector 105 are connected contrary to FIG. 7. That is, the address converting circuit of FIG. 8 firstly calculates logical multiplication between the output of the carryout memory 109 and the output of the CAM 110 by the conformity circuit 111 based on the carryout signal from the adder 108 by the carryout selector 105.

The conformity circuit 111 has an AND gate (first compared result output means) 111a and an AND gate (second compared result output means) 111b. The AND gate 111a calculates logical multiplication between the output of the CAM 110 and a normal output of the carryout memory 109. The other AND gate 111b calculates logical multiplication between the output of the CAM 110 and a inverting output of the carryout memory 109.

The carryout selector 105 selects the output of either of the AND gate 111a or 111b by each entry. The output of the carryout selector 105 is inputted to the physical address selector 107 in order to read out the physical address.

Thus, the fourth embodiment compares the virtual address that access is required with the virtual address stored to the CAM 110. Because of this, it is possible to perform the comparing process more quickly than the case of comparing all the address bits.

Furthermore, in the fourth embodiment, the carryout selector 105 for performing selection based on the carryout signal from the adder 108 is connected to subsequent stage of the conformity circuit 111. Because of this, the adder 108 can carry out calculation on the side safer than the third embodiment.

(Fifth Embodiment)

A fifth embodiment is a modified example of the fourth embodiment.

FIG. 9 is a block diagram showing schematic configuration of the fifth embodiment of the address converting circuit. In FIG. 9, the same figure numbers are attached to the same constituents as FIG. 8. Hereinafter, portions different from the first embodiment will be mainly explained.

The address converting circuit of FIG. 9 has a feature in which connection of the carryout selector 105 and the physical address selector 107 is different from the address converting circuit of FIG. 8. The carryout selector 105 is connected to subsequent stage of the physical address selector 107.

The address converters (first and second address converters) 107a and 107b read out from the physical address storing section 106 the physical address different from each other. The carryout selector 105 selects either of two types of physical addresses that the physical address selector 107 reads out, based on the carryout signal from the adder 108.

Thus, the fifth embodiment compares the virtual address that access is required with the virtual address stored to the CAM 110, based on the conformity detecting result of the upper bit string and the conformity detecting result of the carryout signal from the lower bit string. Because of this, it is possible to perform the comparing process more quickly than the case of comparing all the address bits.

Furthermore, the fifth embodiment provides the carryout selector 105 for selecting the carryout based on the carryout signal from the adder 108 at last stage. Because of this, the fifth embodiment can carry out calculation on the side safer than the fourth embodiment.

(Sixth Embodiment)

A sixth embodiment divides the virtual address that access is required into three types of the upper bit string, an intermediate bit string and the lower bit string, and then compares these bit strings with the virtual address registered to the CAM.

FIG. 10 is a block diagram showing schematic configuration of the sixth embodiment according to the present invention. In FIG. 10, the same figure numbers are attached to the same constituents as FIG. 4. Hereinafter, portions different from the first embodiment will be mainly explained.

The address converting circuit of FIG. 10 has a CLA (Carry Lookaside) circuit 112, adders 113 and 114, CAMs 115 and 116, a conformity circuit 111, a physical address storing section 106, and a physical address selector 107.

The CLA circuit 112 outputs the carry information (carryout signal) in case of adding both of the lower bit strings [7:0] of the base address and the offset address of the virtual address that access is required.

The adder 113 outputs the result [11:8] of adding both of the intermediate bit strings [11:8] of the base address and the offset address of the virtual address that access is required, by presuming that the carry from the lower bit string [7:0] is "0".

The adder 114 outputs the result [11:8] of adding both of the intermediate bit strings [11:8] of the base address and the offset address of the virtual address that access is required, by presuming that the carry from the lower bit string [7:0] is "1".

The CAM 115 has an intermediate bit string storing section (intermediate bit string storing section) 115a and first and second intermediate bit string comparators 115b and 115c.

The intermediate bit string storing section 115a stores the intermediate bit string [12:8] of the base address and the offset address of the virtual address corresponding to data stored to the cache memory.

The first intermediate bit string comparator 115b compares the output [11:8] of the adder 113 and the carryout signal with the intermediate bit string [12:8] of the base address stored to the intermediate bit string storing section 115a by each entry of the cache memory.

The second intermediate bit string comparator 115c compares the output [11:8] of the adder 114 and the carryout signal with the intermediate bit string [12:8] of the base address stored to the intermediate bit string storing section.

The carry out selector 105 outputs the compared result MatchL[3:0] of either of the first or second intermediate 115b or 115c, based on the carryout signal from the CLA circuit 112.

The CAM 116 has the upper bit string storing section 116a and the upper bit string comparator (upper bit string comparator) 116b, by each entry of the cache memory.

The upper bit string storing section 116a stores the upper bit string [31:12] of the base address and the offset address of the virtual address corresponding to data stored to the cache memory.

The upper bit string comparator 116b compares the upper bit strings [31:12] of the base address of the virtual address that access is required with the upper bit string [31:12] of the base address stored to the upper bit string storing section 116a, and compares the upper bit string [31:12] of the offset address of the virtual address that access is required with the upper bit string [31:12] of the offset address stored to the upper bit string storing section 116a. The CAM 116 outputs a signal MatchU[3:0] showing the compared result.

The conformity circuit 111 has an AND gate by each entry, and each of the AND gate calculates logical multiplication of both output of the CAM. The physical address selector 107 reads out the physical address stored to the corresponding entry from the physical address storing section 106.

Thus, the sixth embodiment performs comparison of the upper bit string [31:12] by the CAM 116 without using the adder for the upper bit string [31:12] of the virtual address that access is required, and the CAM 115 compares the result added by the adders 113 and 114 by predicting in advance whether or not there is the carry from the lower bit string for the intermediate bit string [11:8], and after these compared result is obtained, ultimate selection is performed by the carryout signal from the CLA circuit 112. Because of this, even if it takes much time to calculate by the CLA circuit 112, it is possible to convert into the physical address at high speed.

Furthermore, because the sixth embodiment performs comparison of the upper bit string, comparison of the immediate bit string, and the carry calculation from the low bit string in parallel, it is possible to perform comparison of the virtual address efficiently and quickly.

(Seventh Embodiment)

A seventh embodiment is a modified example of the sixth embodiment.

Figure 11:
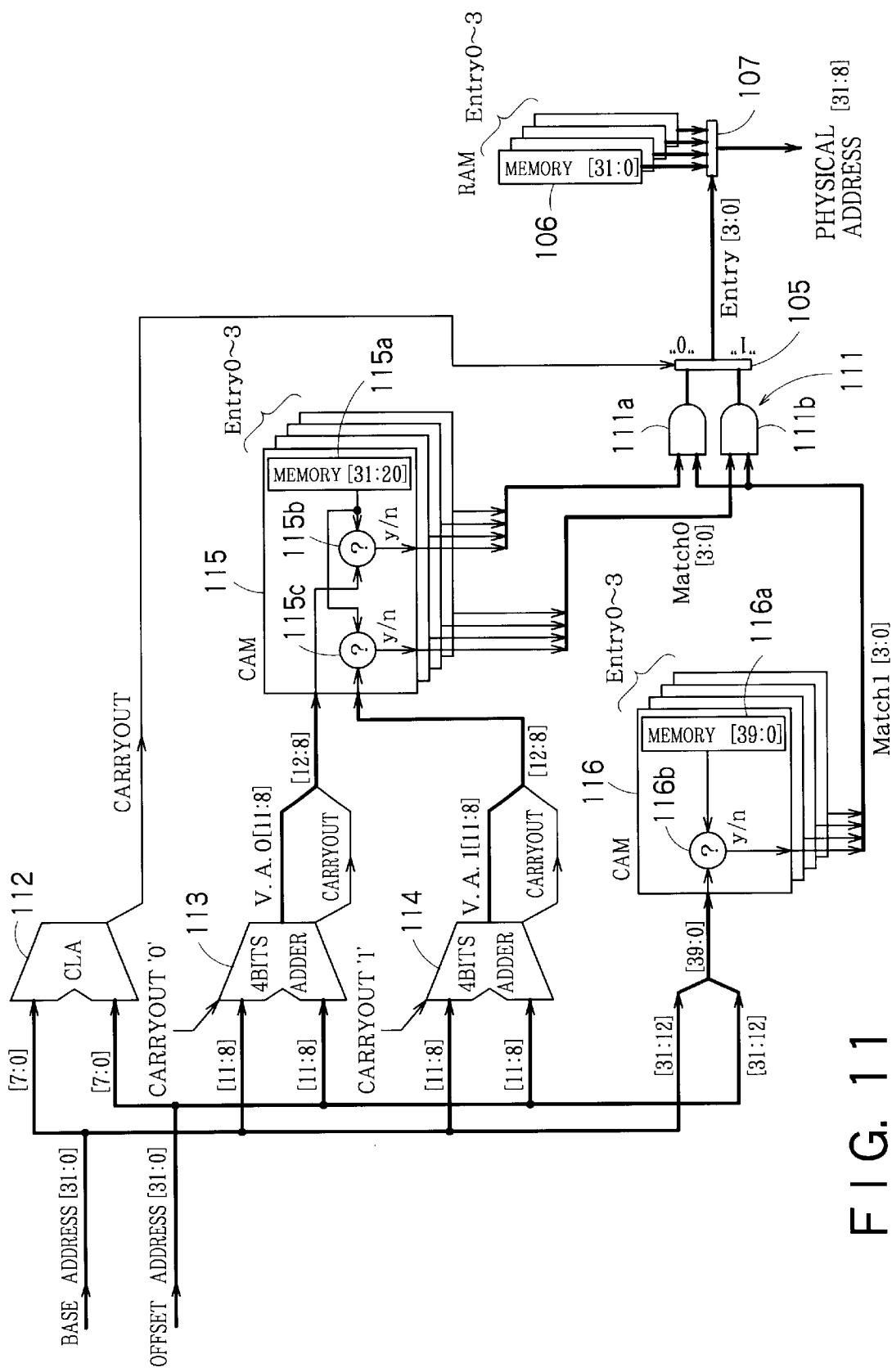
FIG. 11 is a block diagram showing schematic configuration of a seventh embodiment of an address converting circuit.

FIG. 11 is a block diagram showing schematic configuration of the seventh embodiment according to the present invention. In FIG. 11, the same figure numbers are attached to the same constituents as FIG. 10. Hereinafter, portions different from the sixth embodiment will be mainly explained.

The address converting circuit of FIG. 11 has a feature in which connection of the carryout selector 105 and the conformity circuit 111 is different from the address converting circuit of FIG. 10. The carryout selector 105 is connected to subsequent stage of the conformity circuit 111.

The conformity circuit 111 is provided with two pieces of the AND gates 111a and 111b by each entry. The AND gate 111a calculates logical multiplication between the compared result of the first intermediate bit string comparator 115b and the compared result of the CAM 115. The other AND gate 111b calculates logical multiplication between the compared result of the second intermediate bit string comparator 115c in the CAM 115 and the compared result of the CAM 115.

The carryout selector 105 selects either of the AND gates 111a and 111b based on the carryout signal from the CLA circuit 112 by each entry. The physical address selector 107 selects entry of the physical address storing section 106 and reads out the physical address, based on the selected result of the carryout selector 105.

Thus, the seventh embodiment performs to comparison of the intermediate bit string by predicting in advance whether or not there is the carry from the lower bit string of the virtual address that access is required, similarly to the sixth embodiment. Because of this, it is possible to perform the comparing process in parallel with the calculation process by the CLA circuit 112, thereby converting into the physical address at high speed.

Furthermore, the seventh embodiment provides the carryout selector 105 at subsequent stage of the conformity circuit 111. Because of this, the carryout signal may be outputted from the CLA circuit 112 by when the conformity result is outputted from the conformity circuit 111. Therefore, the CLA circuit 112 can perform calculation on the safe side.

(Eight Embodiment)

An eighth embodiment is a modified example of the seventh embodiment.

FIG. 12 is a block diagram showing schematic configuration of the eighth embodiment according to the present invention. In FIG. 12, the same figure numbers are attached to the same constituents as FIG. 11. Hereinafter, portions different from the seventh embodiment will be mainly explained.

The address converting circuit of FIG. 12 has a feature in which connection of the carryout selector 105 and the physical address selector 107 is different from the address converting circuit of FIG. 8. The carryout selector 105 is connected to subsequent stage of the physical address selector 107.

The physical address selector 107 reads out from the CLA circuit the physical address different from each other, based on the output of the conformity circuit 111. The carryout selector 105 selects either of two types of the physical addresses that the physical address selector 107 has read out.

Thus, similarly to the sixth and seventh embodiments, the eighth embodiment also compares the virtual address that access is required with the virtual address stored to the CAM 115 and 116, based on the conformity result of the upper bit string, the conformity circuit of the intermediate bit string, and the conformity result of the carryout signal from the lower bit string. Because of this, it is possible to perform the comparing process more quickly than the case of comparing all the address bits.

Furthermore, in the eighth embodiment, the carryout selector 105 for selecting the carry based on the carryout signal from the CLA circuit 112 is provided to last stage. Because of this, the adder can calculate on the side further safer than the seventh embodiment.

In the above-mentioned embodiments, the number of bits of the upper bit string, the intermediate bit string, and the lower bit string is not especially limited. That is, the number of bits of the upper bit string may not be necessarily bits[31:12], the number of bits of the intermediate bit stream may not be necessarily bits[11:8], and the number of bits of the lower bit stream may not be necessarily bits[7:0].

In the above embodiment, the address converter used to the TLBs in the processor was explained. However, the present invention is also applicable to circuits besides the processor.

What is claimed is:

1. An address conversion circuit for converting a virtual address that access is required into a physical address, comprising:

upper bit string storing means configured to store an upper bit string of the virtual address corresponding to data stored to a cache memory;

an upper bit string adder configured to add both of the upper bit strings of a base address and an offset address of the virtual address, by predicting in advance with or without carry when both of a lower bit strings of the base address and the offset address of the virtual address that access is required are added;

a carry calculator configured to calculate carry information when both of the lower bit strings of the base address and the offset address of the virtual address that access is required are added;

an upper bit string comparator configured to compare a result added by said upper bit string adder with the upper bit string of the virtual address stored to said upper bit string storing means, and an address converter configured to convert the virtual address that access is required into the physical address, based on a result calculated by said carry calculator and a result compared by said upper bit stream comparator.

2. The address converting circuit according to claim 1, wherein said upper bit string adder including:

a first adder configured to output a result adding both of the upper bit string of the base address and the offset address of the virtual address that access is required, and a second adder configured to output a result adding both of the upper bit strings of the base address and the offset address of the virtual address that access is required, and further adding "1", wherein said upper bit string comparator including:

a first comparator configured to compare the result added by said first adder with the upper bit string of the virtual address stored to said upper bit string storing means, and a second comparator configured to compare the result added by said second adder with the upper bit string of the virtual address stored to said upper bit string storing means, wherein said address converter includes a selector configured to select the result compared by either said first or second comparator, based on the carry information calculated by said carry calculator, and converts the virtual address that access is required into the physical address.

3. The address converting circuit according to claim 2, wherein said cache memory has a plurality of entries, wherein said upper bit string storing means store the upper bit string of the virtual address, by each entry of said cache memory, wherein said first comparator compares the result added by said first adder with the upper bit string of the virtual address corresponding to each entry stored to said upper bit string storing means, by each entry of said cache memory, and wherein said second comparator compares the result added by said second adder with the upper bit string of the virtual address corresponding to each entry stored to said upper bit string storing means, by each entry of said cache memory.

4. The address converting circuit according to claim 1, wherein said upper bit string adder including:

a first adder configured to output the result of adding both of the upper bit strings of the base address and the offset address of the virtual address that access is required, and a second adder configured to output the result adding both of the upper bit strings of the base address and the offset address of the virtual address that access is required, and further adding "1", said upper bit string comparator including:

a first comparator configured to compare the result added by said first adder with the upper bit string of the virtual address stored to said upper bit string storing means, and a second comparator configured to compare the result added by said second adder with the upper bit string of the virtual address stored to said upper bit string storing means, wherein said address converter including:

a first address converter configured to convert the virtual address that access is required into the physical address, based on the result compared by said first comparator;

a second address converter configured to convert the virtual address that access is required into the physical address, based on the result compared by said second comparator, and a physical address selector configured to select the physical address converted by either said first or second address converter, based on the carry information calculated by said carry calculator.

5. The address converting circuit according to claim 4, wherein said cache memory has a plurality of entries, wherein said upper bit string storing means store the upper bit string of the virtual address, by each entry of said cache memory, wherein said first comparator compares the result added by said first adder with the upper bit string of the virtual address corresponding to each entry stored to said upper bit string storing means, by each entry of said cache memory, wherein said second comparator compares the result added by said second adder with the upper bit string of the virtual address corresponding to each entry stored to said upper bit string storing means, wherein said first address converter converts the virtual address that access is required into the physical address based on the result compared by said first comparator compared by each entry, and wherein said second address converter converts the virtual address that access is required into the physical address based on the compared result compared by said second comparator by each entry.

6. The address converting circuit according to claim 1, wherein said cache memory has a plurality of entries, wherein said upper bit string storing means store the upper bit string of the virtual address, by each entry of said cache memory, and wherein said upper bit string comparator compares the result added by said upper bit string adder with the upper bit string of the virtual address corresponding to each entry stored to said upper bit string storing means, by each entry of said cache memory.

7. An address converter configured to convert a virtual address that access is required into a physical address, comprising:

upper bit string storing means configured to store an upper bit string of the virtual address corresponding to data stored to a cache memory;

carry information storing means configured to calculate carry information in case of adding both of a lower bit strings of a base address and an offset address of the virtual address corresponding to data stored to the cache memory;

a carry information calculator configured to calculate the carry information in case of adding both of the lower bit strings of the base address and the offset address of the virtual address that access is required;

an upper bit string comparator configured to compare the upper bit strings of the base address and the offset address of the virtual address that access is required with the upper bit strings of the base address and the offset address of the virtual address stored to said upper bit string storing means, and address converter for converting the virtual address that access is required into the physical address based on information stored to said carry information storing means, carry information calculated by said carry information, and the result compared by said upper bit string comparator.

8. The address converting circuit according to claim 7, further comprising an carry information comparator for comparing the carry information calculated by said carry information calculator with the carry information stored to said carry information storing means, wherein said address converter converts the virtual address that access is required into the physical address, based on the result compared by said carry information comparator and the result compared by said upper bit string comparator.

9. The address converting circuit according to claim 8, wherein said cache memory has a plurality of entries, wherein said upper bit string storing means stores the upper bit string of the virtual address by each entry of said cache memory, wherein said carry information storing means store the carry information in case of adding both of the lower bit strings of the base address and the offset address of the virtual address by each entry of said cache memory, wherein said upper bit string comparator compares the result added by said upper bit string adder with the upper bit string of the virtual address corresponding to each entry stored to said upper bit string storing means, and wherein said carry information comparator compares the carry information calculated by said carry information calculator with the carry information corresponding to each entry stored to said carry information storing means.

11. The address converting circuit according to claim 7, further comprising:

first compared result output means configured to output the result of comparing the upper bit string that access is required with the upper bit string of the virtual address stored to the cache memory in case of presuming that there is carry from the lower bit string, based on the result of comparing the carry information stored to said carry information storing means with the result compared by said upper bit string comparator, and second compared result output means configured to output the result of comparing the upper bit string of the virtual address that access is required with the upper bit string of the virtual address stored to the cache memory in case of presuming that there is no carry from the lower bit string, based on the result of comparing the carry information stored to said carry information storing means with the result compared by said upper bit string comparator, wherein said address converter has a selector configured to select the compared result outputted from either said first or second compared result output means, based on the carry information calculated by said carry information calculator, and converts the virtual address that access is required into the physical address, based on the result selected by said selector.

11. The address converting circuit according to claim 10, wherein said cache memory has a plurality of entries, wherein said upper bit string storing means stores the upper bit string of the virtual address by each entry of said cache memory, wherein said carry information storing means store the carry information in case of adding both of the lower bit strings of the base address and the offset address of the virtual address by each entry of said cache memory by each entry of said cache memory, wherein said upper bit string comparator compares the result added by said upper bit string adder with the upper bit string of the virtual address corresponding to each entry stored to said upper bit string storing means by each entry of said cache memory, wherein said carry information comparator compares the carry information calculated by said carry information calculator with the carry information corresponding to each entry stored to said carry information storing means by each entry of said cache memory, wherein said first compared result output means outputs the result of comparing the upper bit string of the virtual address that access is required with the upper bit string of the virtual address stored to said cache memory in case of presuming that there is a carry from the lower bit string by each entry of said cache memory, and wherein said second compared result output means output the result of comparing the upper bit string of the virtual address that access is required with the upper bit string of the virtual address stored to said cache memory in case of presuming that there is no carry from the lower bit string by each entry of said cache memory.

12. The address converting circuit according to claim 7, further comprising:

first compared result output means for outputting the result of comparing the upper bit string of the virtual address that access is required with the upper bit string of the virtual address stored to said cache memory in case of presuming that there is carry from the lower bit stream, based on the carry information stored to said carry information storing means and the result compared by said upper bit string comparator, and second compared result output means for outputting the result of comparing the upper bit string of the virtual address that access is required with the upper bit string of the virtual address stored to the cache memory in case of presuming that there is not carry from the lower bit string, based on the result of comparing the carry information stored to said carry information storing means with the result compared by said upper bit string comparator, wherein said address converter including:

a first address converter configured to convert the virtual address that access is required into the physical address, based on the result compared by said first compared result output means;

a second address converter configured to convert the virtual address that access is required into the physical address, based on the result compared by said second compared result output means, and a selector configured to select the physical address converted by either said first or second address converter, based on the carry information calculated by said carry information calculator.

13. The address converting circuit according to claim 12, wherein said cache memory has a plurality of entries, wherein said upper bit string storing means stores the upper bit string of the virtual address by each entry of said cache memory, wherein said carry information storing means store the carry information in case of adding both of the lower bit strings of the base address and the offset address of the virtual address by each entry of said cache memory, wherein said upper bit string comparator compares the result added by said upper bit string adder with the upper bit string of the virtual address corresponding to each entry stored to said upper bit string storing means by each entry of said cache memory, wherein said carry information comparator compares the carry information calculated by said carry information calculator with the carry information corresponding to each entry stored to said carry information storing means by each entry of said cache memory, wherein said first compared result output means outputs the result of comparing the upper bit string of the virtual address that access is required with the upper bit string of the virtual address stored to said cache memory in case of presuming that there is a carry from the lower bit string by each entry of said cache memory, wherein said second compared result output means output the result of comparing the upper bit string of the virtual address that access is required with the upper bit string of the virtual address stored to said cache memory in case of presuming that there is no carry from the lower bit string by each entry of said cache memory, wherein said first address converter converts the virtual address that access is required into the physical address based on the output of said first compared result output means compared by each entry of said cache memory, and wherein said second address converter converts the virtual address that access is required into the physical address based on the output of said second compared result output means compared by each entry.

14. An address converting circuit configured to convert a virtual address that access is required into a physical address, comprising:

upper bit string storing means configured to store an upper bit string of the virtual address corresponding to data stored to a cache memory;

an intermediate bit string storing means configured to store intermediate bit strings of the virtual address corresponding to data stored to said cache memory;

an intermediate bit string adder configured to add both of intermediate bit strings of a base address and an offset address of the virtual address, by predicting in advance with or without a carry in case of adding both lower bit strings of the base address and the offset address of the virtual address that access is required;

an intermediate bit string comparator configured to compare the result added by said intermediate bit string adder with the intermediate bit string of the virtual address stored to said intermediate bit string storing means;

an upper bit string comparator configured to compare the upper bit string of the base address and the offset address of the virtual address that access is required with the upper bit strings of the base address and the offset address of the virtual address stored to said upper bit stream storing means;

carry information calculator configured to calculate the carry information in case of adding both of the lower bit strings of the base address and the offset address of the virtual address that access is required, and an address converter configured to convert the virtual address that access is required into the physical address based on the result compared by said upper bit stream comparator, the result compared by said intermediate bit stream comparator, and the result calculated by said carry information calculator.

15. The address converting circuit according to claim 14, wherein said intermediate bit string adder including:

a first adder configured to output the result of adding both of the intermediate bit strings of the base address and the offset address of the virtual address that access is required, and a second adder configured to output the result of adding both of the intermediate bit strings of the base address and the offset address of the virtual address that access is required, and further adding to "1", wherein said intermediate bit string comparator including:

a first comparator configured to output the result of comparing the result added by said first adder with the intermediate bit stream of the virtual address stored to said intermediate bit string storing means, and a second comparator configured to output the result of comparing the result added by said second adder with the intermediate bit stream of the virtual address stored to said intermediate bit string storing means, wherein said address converter has a selector configured to select and output the result compared by either said first or second comparator, and converts the virtual address that access is required into the physical address, based on the output of said selector and the result compared by said upper bit string comparator.

16. The address converting circuit according to claim 15, wherein said cache memory has a plurality of entries, wherein said upper bit string storing means stores the upper bit string of the virtual address by each entry of said cache memory;

wherein said intermediate bit string storing means store the intermediate bit string of the virtual address by each entry of said cache memory;

wherein said upper bit string comparator compares the result added by said upper bit string comparator with the upper bit string of the virtual address corresponding to each entry stored to said upper bit string storing means by each entry of said cache memory, and wherein said intermediate bit string comparator compares the result added by said intermediate bit string adder with the intermediate bit string of the virtual address corresponding to each entry stored to said intermediate bit string storing means by each entry of said cache memory.

17. The address converting circuit according to claim 14, wherein said intermediate bit string adder including:

a first adder configured to add the result of adding both of the intermediate bit strings of the base address and the offset address that access is required, and a second adder configured to add the result of adding both of the intermediate bit strings of the base address and the offset address that access is required, and further adding "1", wherein said intermediate bit string comparator including:

a first comparator configured to output the result of comparing the result added by said first adder with the intermediate bit stream of the virtual address stored to said intermediate bit string storing means, and a second comparator configured to output the result of comparing the result added by said second adder with the intermediate bit stream of the virtual address stored to said intermediate bit string storing means, wherein said address converter including:

a first conformity circuit configured to calculate logical multiplication of the result compared by said first comparator and the result compared by said upper bit string comparator;

a second conformity circuit configured to calculate logical multiplication of the result compared by said second comparator and the result compared by said upper bit string comparator;

a selector configured to select the output of either said first or second conformity circuit based on the result calculated by said carry information calculator, and a physical address selector configured to convert the virtual address that access is required into the physical address, based on the result selected by said selector.

18. The address converting circuit according to claim 17, wherein said cache memory has a plurality of entries, wherein said upper bit string storing means stores the upper bit string of the virtual address by each entry of said cache memory;

wherein said intermediate bit string storing means store the intermediate bit string of the virtual address by each entry of said cache memory;

wherein said upper bit string comparator compares the result added by said upper bit string comparator with the upper bit string of the virtual address corresponding to each entry stored to said upper bit string storing means, wherein said intermediate bit string comparator compares the result added by said intermediate bit string adder with the intermediate bit string of the virtual address corresponding to each entry stored to said intermediate bit string storing means, wherein said first conformity circuit calculates logical multiplication of the result compared by said first comparator and the result compared by upper bit string comparator corresponding to each entry, and wherein said second conformity circuit calculates logical multiplication of the result compared by said second comparator and the result compared by said upper bit string comparator corresponding to each entry.

19. The address converting circuit according to claim 14, wherein said intermediate bit string adder including:

a first adder configured to output the result of adding both of the intermediate bit strings of the base address and the offset address of the virtual address that access is required;

a second adder configured to output the result of adding both of the intermediate bit strings of the base address and the offset address of the virtual address that access is required, and further adding "1", wherein said intermediate bit string comparator including:

a first comparator configured to output the result of comparing the result added by said first adder with the intermediate bit string of the virtual address stored to said intermediate bit string storing means, and a second comparator configured to output the result of comparing the result added by said second adder with the intermediate bit string of the virtual address stored to said intermediate bit string storing means, wherein said address converter including:

a first address converter configured to convert the virtual address that access is required into the physical address, based on the results compared by both of said first comparator and said upper bit string comparator;

a second address converter configured to convert the virtual address that access is required into the physical address, based on the results compared by both of said second comparator and said upper bit string comparator, and a selector configured to select the physical address converted by either of said first or second address converter.

20. The address converting circuit according to claim 19, wherein said cache memory has a plurality of entries, wherein said upper bit string storing means stores the upper bit string of the virtual address by each entry of said cache memory;

wherein said intermediate bit string storing means store the intermediate bit string of the virtual address by each entry of said cache memory;

wherein said upper bit string comparator compares the result added by said upper bit string comparator with the upper bit string of the virtual address corresponding to each entry stored to said upper bit string storing means by each entry of said cache memory, wherein said intermediate bit string comparator compares the result added by said intermediate bit string adder with the intermediate bit string of the virtual address corresponding to each entry stored to said intermediate bit string storing means by each entry of said cache memory, wherein said first comparator outputs the result of comparing the result added by said first adder with the intermediate bit string of the virtual address corresponding to each entry stored to said intermediate bit string storing means by each entry of said cache memory, and wherein said second comparator outputs the result of comparing the result added by said second adder with the intermediate bit string of the virtual address corresponding to each entry stored to said intermediate bit string storing means by each entry of said cache memory.

\* \* \* \* \*